(12) United States Patent
Zanoria et al.

(10) Patent No.: US 11,852,240 B2
(45) Date of Patent: Dec. 26, 2023

(54) FOLLOWABILITY ENHANCER FOR A ROTATIONAL SEAL

(71) Applicant: Caterpillar Inc., Peoria, IL (US)

(72) Inventors: Elmer S Zanoria, Dunlap, IL (US); Hong Lian, Peoria, IL (US); Keith Harmeyer, Lafayette, IN (US); Daniel Joshua Smith, Pekin, IL (US)

(73) Assignee: Caterpillar Inc., Peoria, IL (US)

( * ) Notice: Subject to any disclaimer, the term of this patent is extended or adjusted under 35 U.S.C. 154(b) by 1 day.

(21) Appl. No.: 17/652,342

(22) Filed: Feb. 24, 2022

(65) Prior Publication Data

US 2023/0265925 A1     Aug. 24, 2023

(51) Int. Cl.
| | |
|---|---|
| *F16J 15/32* | (2016.01) |
| *F16J 15/3244* | (2016.01) |
| *F16J 15/3256* | (2016.01) |
| *F16J 15/322* | (2016.01) |
| *F16J 15/3224* | (2016.01) |

(52) U.S. Cl.
CPC ......... *F16J 15/3244* (2013.01); *F16J 15/322* (2013.01); *F16J 15/3224* (2013.01); *F16J 15/3256* (2013.01)

(58) Field of Classification Search
CPC .... F16J 15/3244; F16J 15/322; F16J 15/3224; F16J 15/3256
See application file for complete search history.

(56) References Cited

U.S. PATENT DOCUMENTS

| | | | | |
|---|---|---|---|---|
| 1,969,797 A | * | 8/1934 | Hubbard | F16J 15/3208 277/556 |
| 2,076,747 A | * | 4/1937 | Salisbury | F16C 33/74 277/377 |
| 2,316,941 A | * | 4/1943 | Dodge | F16J 15/3456 277/944 |
| 2,804,325 A | * | 8/1957 | Riesing | F16J 15/3244 277/577 |
| 2,882,074 A | * | 4/1959 | Charhut | F16J 15/3208 277/577 |
| 2,998,987 A | * | 9/1961 | Taschenberg | F16J 15/3284 277/560 |

(Continued)

FOREIGN PATENT DOCUMENTS

| | | |
|---|---|---|
| CA | 2249916 A1 | 9/1999 |
| CN | 201810776 U | 4/2011 |
| CN | 213271011 U | 5/2021 |

*Primary Examiner* — Vishal A Patel

(57) ABSTRACT

A rotational seal assembly is associated with a rotating component. The rotational seal includes an outer casing, an inner casing, a rotational seal connected to the outer casing and the inner casing, and a followability enhancer. A section of the rotational seal includes a heel portion and a toe portion. The rotational seal is configured to contact, via a first surface of the section of the rotational seal and during operation of the rotating component, the rotating component. The followability enhancer is configured to contact, during the operation of the rotating component, a first region of a second surface of the section of the rotational seal that is associated with the toe portion. The followability enhancer is configured to not contact, during the operation of the rotating component, a second region of the second surface of the section of the rotational seal that is associated with the heel portion.

14 Claims, 8 Drawing Sheets

(56) References Cited

U.S. PATENT DOCUMENTS

| | | | | |
|---|---|---|---|---|
| 3,099,454 A | * | 7/1963 | Walinski | F16J 15/3208 |
| | | | | 277/565 |
| 3,576,328 A | * | 4/1971 | Vose | F16J 15/3216 |
| | | | | 277/572 |
| 3,771,799 A | * | 11/1973 | Sekulich | F16J 15/3456 |
| | | | | 277/386 |
| 4,383,691 A | * | 5/1983 | Potter | F16J 15/3204 |
| | | | | 277/569 |
| 6,170,833 B1 | * | 1/2001 | Cox | F16J 15/3244 |
| | | | | 277/559 |
| 6,688,603 B2 | * | 2/2004 | vom Schemm | F16J 15/3228 |
| | | | | 277/556 |
| 7,854,433 B2 | | 12/2010 | Berdichevsky | |
| 10,041,596 B2 | * | 8/2018 | Koch | F16J 15/46 |

* cited by examiner

FOLLOWABILITY ENHANCER FOR A ROTATIONAL SEAL

TECHNICAL FIELD

The present disclosure relates generally to a followability enhancer for a rotational seal and, for example, to a followability enhancer for a rotational seal of a rotational seal assembly.

BACKGROUND

A machine often includes a transmission, an engine, a pump, and/or other machinery that contain one or more rotating parts, such as a shaft. The one or more rotating parts require lubrication to maintain the machine's performance. A shaft assembly (e.g., a crankcase or a similar assembly) typically contains a lubricant, such as oil, that provides lubrication for the one or more rotating parts and a rotational seal is typically included in the shaft assembly to prevent leakage of the lubricant during operation of the one or more rotating parts. However, due to mechanical forces associated with operation of the one or more rotating parts, a region of the rotational seal is often subject to wear and plastic deformation, which result in premature failure of the rotational seal and thereby leakage of the lubricant from the shaft assembly. This can cause damage to the one or more rotating parts and therefore the rotational seal needs to be replaced, which requires the machine to be taken out of service to be repaired.

Canada Patent Application Publication No. 2,249,916 (the '916 publication) discloses a hinge member that is connected to an outside surface of a rigid case and to a gasket. The gasket is bonded directly to the hinge member on its outside edge. The hinge member has a torus profile in plan view and is radially flexible, which allows for the sealing element to follow an eccentric shaft. However, a conformal mating connection of a sealing element to another hinge member, along a circumference of its outside edge can increases wear on the region in contact with the rotating part.

The followability enhancer of the present disclosure solves one or more of the problems set forth above and/or other problems in the art.

SUMMARY

In some implementations, a rotational seal assembly associated with a rotating component includes an outer casing; an inner casing; a rotational seal connected to the outer casing and the inner casing; and a followability enhancer, wherein: a section of the rotational seal includes a heel portion and a toe portion; the rotational seal is configured to contact, via a first surface of the section of the rotational seal and during operation of the rotating component, the rotating component; the followability enhancer is configured to contact, during the operation of the rotating component, a first region of a second surface of the section of the rotational seal that is associated with the toe portion; and the followability enhancer is configured to not contact, during the operation of the rotating component, a second region of the second surface of the section of the rotational seal that is associated with the heel portion.

In some implementations, a rotational seal assembly associated with a rotating component includes a rotational seal that includes a section with a heel portion and a toe portion; and a followability enhancer, wherein: the followability enhancer is configured to contact, during operation of the rotating component, a first region of a surface of the section of the rotational seal that is associated with the toe portion; and the followability enhancer is configured to not contact, during the operation of the rotating component, a second region of the surface of the section of the rotational seal that is associated with the heel portion.

In some implementations, a followability enhancer includes an elastically compliant feature, wherein: the elastically compliant feature is configured to contact, during operation of a rotating component, a first region of a surface of a section of a rotational seal that is associated with a toe portion of the section of the rotational seal; and the elastically compliant feature is configured to not contact, during the operation of the rotating component, a second region of the surface of the section of the rotational seal that is associated with a heel portion of the section of the rotational seal.

DETAILED DESCRIPTION

This disclosure relates to a followability enhancer for a rotational seal, which is applicable to any machine that utilizes a rotational seal assembly for a rotating component. For example, the machine may be a construction machine, a marine vessel, an automobile, a transportation vehicle, or another type of machine.

Figure 1:
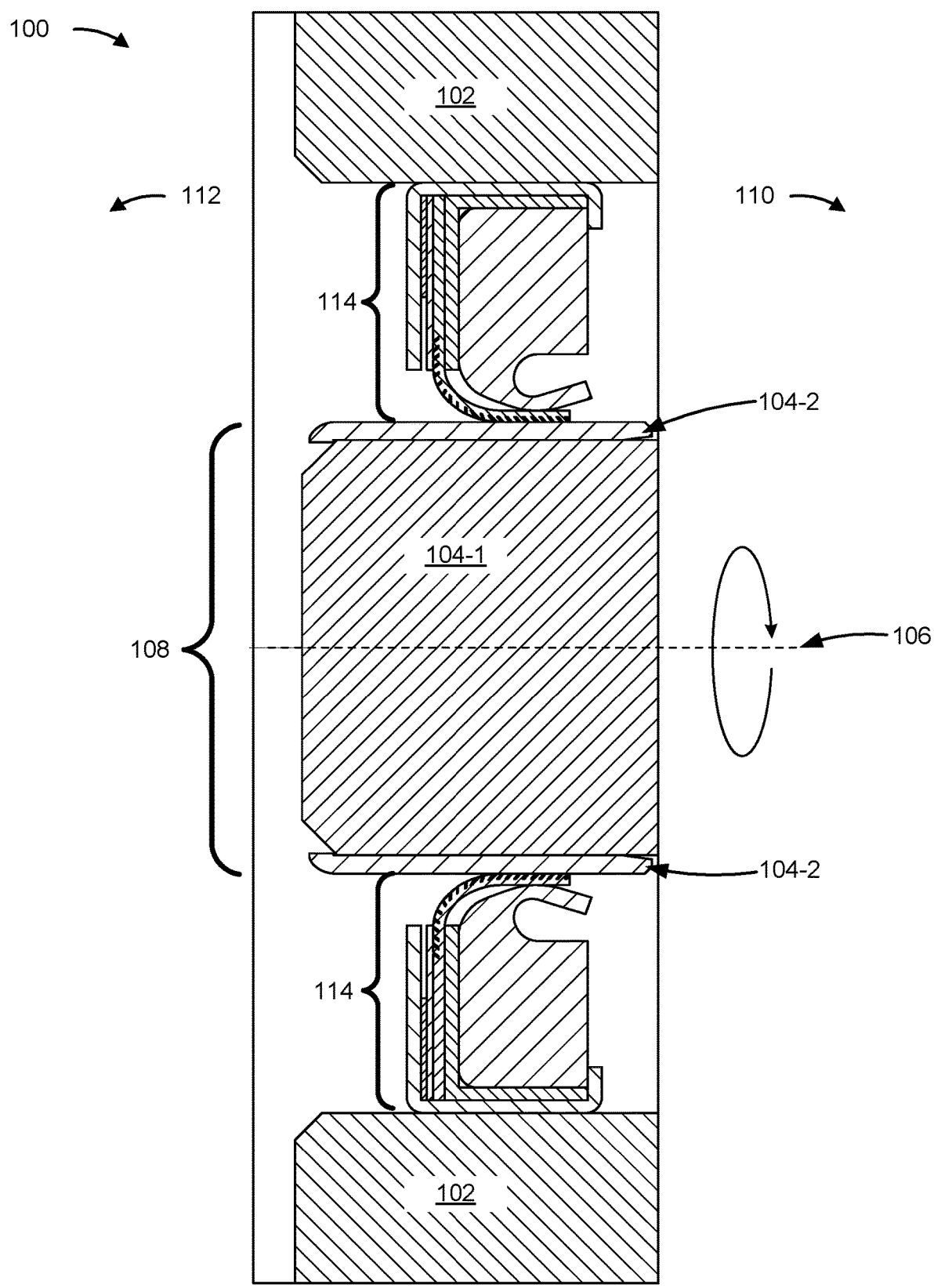
FIG. 1 is a diagram of an example housing for a rotating component described herein.

FIG. 1 is a diagram 100 of an example housing 102, such as for a transmission, an engine, a pump, and/or other machinery of a machine. A rotating component 104 may rotate about an axis 106 (e.g., during operation of the rotating component 104) in an opening 108 (e.g., a bore through which the rotating component 104 extends) that is associated with the housing 102. As shown in FIG. 1, the rotating component 104 may include a shaft 104-1, one or more wear sleeves 104-2, and/or another component.

As further shown in FIG. 1, the housing 102 may have an interior 110 and an exterior 112. The interior 110 may contain a liquid fluid, such as a coolant, a transmission fluid, an engine oil, a hydraulic pump fluid, or another fluid, and the exterior 112 may be exposed to an external environment. Accordingly, the housing 102 may include one or more rotational seal assemblies 114 (described in further detail herein) that are each configured to prevent transmission of the liquid fluid from the interior 110 to the exterior 112.

As indicated above, FIG. 1 is provided as an example. Other examples may differ from what is described in connection with FIG. 1.

FIGS. 2A-2G are diagrams of example configurations 200 of a rotational seal assembly 114 described herein. As shown in FIGS. 2A-2G, the rotational seal assembly 114 may include an outer casing 202, an inner casing 204, a rotational seal 206, and a followability enhancer 208.

The outer casing 202 and the inner casing 204 may each comprise metal, such as aluminum and/or steel, and each may be configured to hold one or more other components of the rotational seal assembly 114. In some implementations, the outer casing 202 may have a particular profile (e.g., an L-shaped profile, as shown in FIGS. 2A-2G) that defines an interior side and an exterior side of the outer casing 202. The inner casing 204 may be configured to be position on the interior side of the outer casing 202. For example, as shown in FIGS. 2A-2G, the inner casing 204 may have a similar profile (e.g., an L-shaped profile) as that of the outer casing 202, and may be positioned on the interior side of the outer casing 202 such that an exterior side of the inner casing 204 faces the interior side of the outer casing 202.

The inner casing 204 may be connected to the outer casing 202. For example, as shown in FIGS. 2A-2G, a top section of the inner casing 204 may be connected to a top section of the outer casing 202 by press fit. In some implementations, a space (e.g., a gap) may be formed between the inner casing 204 and the outer casing 202. For example, as shown in FIGS. 2A-2G, a space may be formed between a side section of the inner casing 204 and the outer casing 202.

The rotational seal 206 may comprise of polytetrafluoroethylene (PTFE)). The rotational seal 206 may be connected to at least one of the outer casing 202 or the inner casing 204. For example, as shown in FIGS. 2A-2G, a portion of the rotational seal 206 may be positioned in the space formed between the inner casing 204 and the outer casing 202. Accordingly, the inner casing 204 and the outer casing 202 may clamp the portion of the rotational seal 206 such that that the rotational seal 206 remains connected to the inner casing 204 and/or the outer casing 202 (e.g., during operation of the rotating component 104).

As further shown in FIGS. 2A-2G, the rotational seal 206 may include a section 210 that includes a heel portion 212 and a toe portion 214. The heel portion 212 may be associated with a bend of the rotational seal 206 and/or may be closer to the outer casing 202 and/or the inner casing 204 than the toe portion 214. The toe portion 214 may be associated with an end of the rotational seal 206 (e.g., that is not connected to the outer casing 202 and/or the inner casing 204). The toe portion 214 may not be associated with the bend of the rotational seal 206 and/or may be farther from the outer casing 202 and/or the inner casing 204 than the heel portion 212. In some implementations, the rotational seal 206 may include a plurality of grooves 216 (e.g., that facilitate a sealing property of the rotational seal 206) that are arranged at different positions on a bottom surface of the section 210 of the rotational seal 206.

In some implementations, the rotational seal 206 may be configured to contact, via the bottom surface of the section 210 of the rotational seal 206, the rotating component 104 (e.g., that includes a shaft 104-1 and/or a wear sleeve 104-2, as described herein in relation to FIG. 1), such as during operation of the rotating component 104 (e.g., when the rotating component 104 is rotating about the axis 106). In this way, the plurality of grooves 216 may contact the rotating component 104.

Figure 2A:
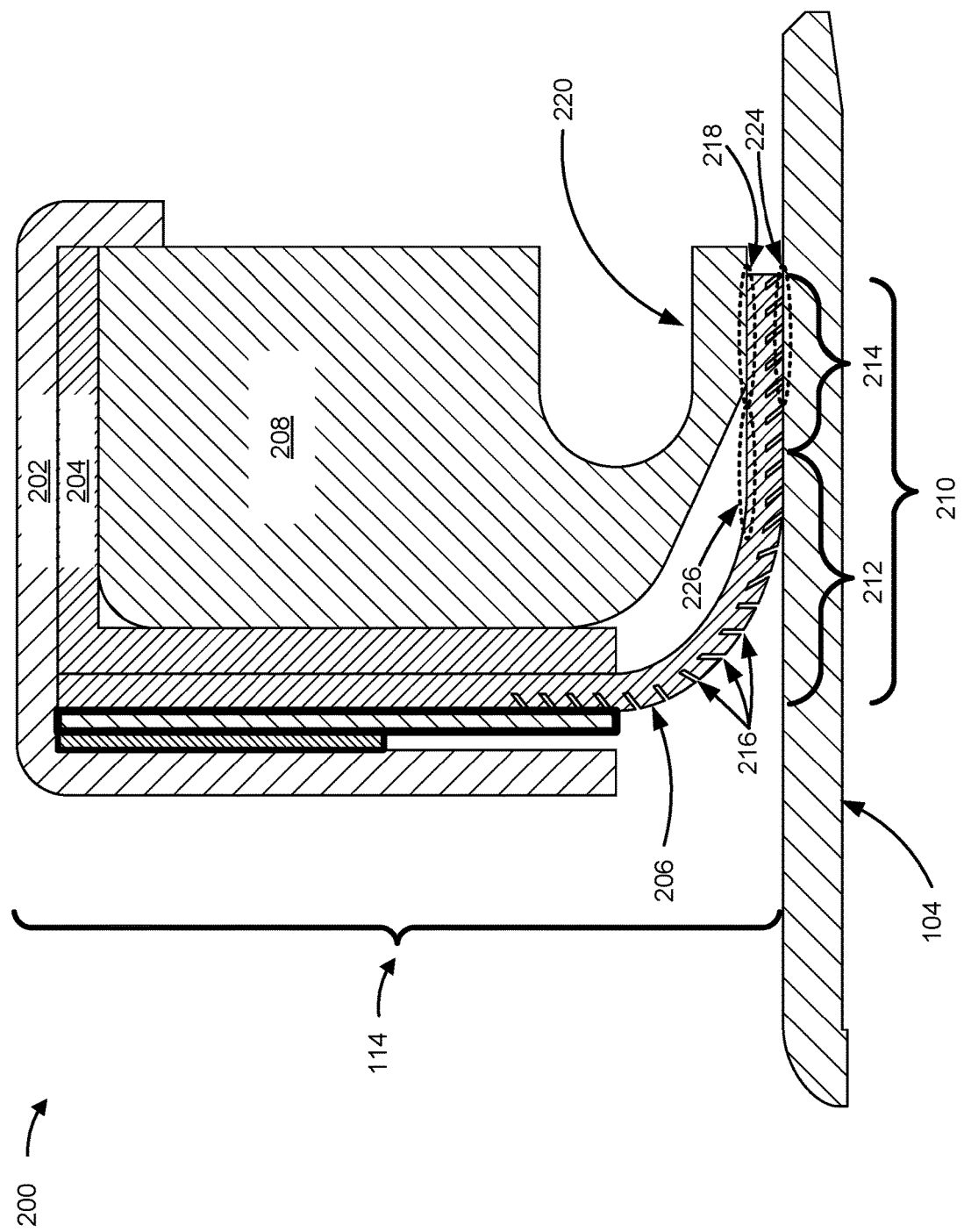
FIGS. 2A-2G are diagrams of example configurations of a rotational seal assembly described herein that is associated with the rotating component.
Figure 2B:
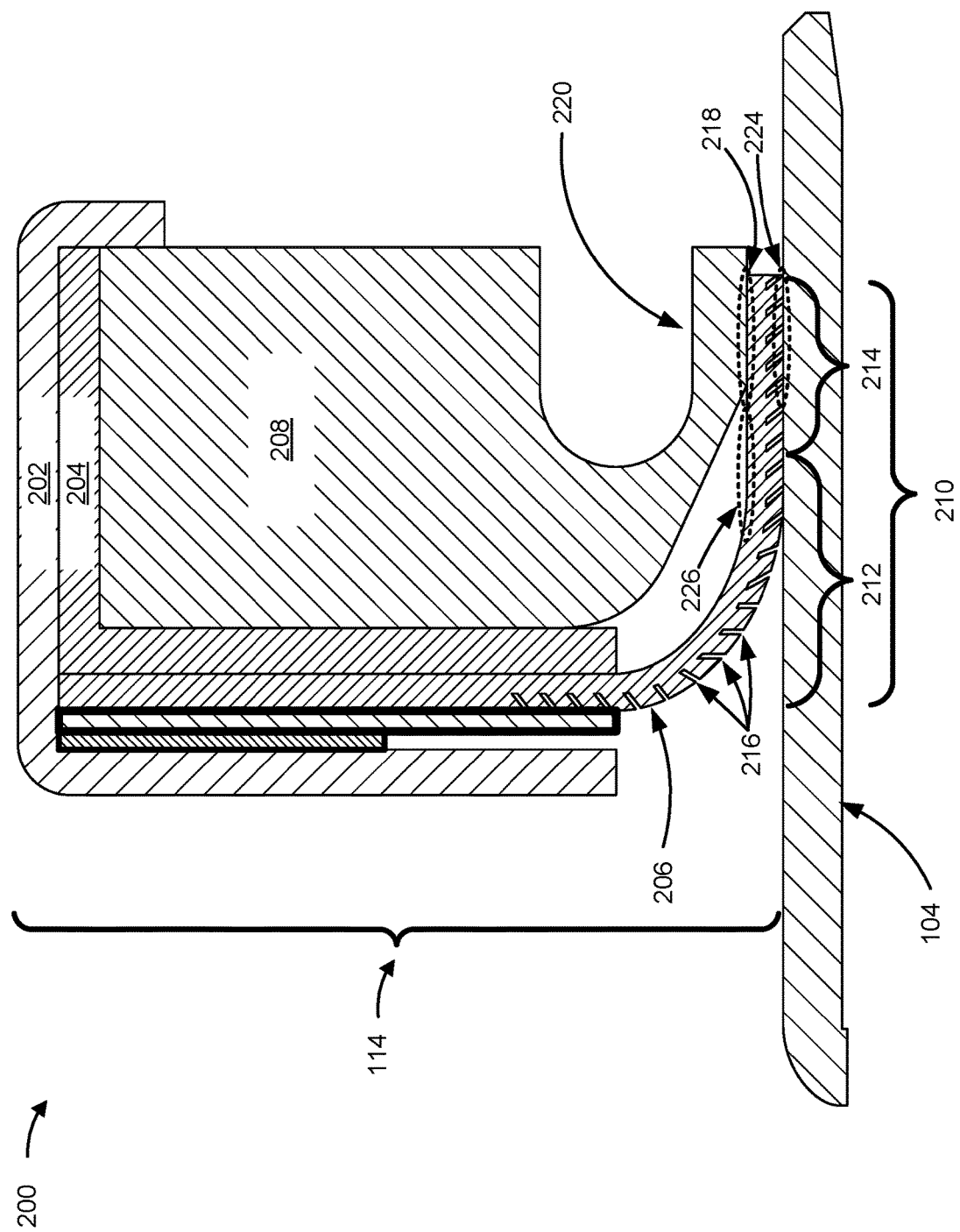
Figure 2C:
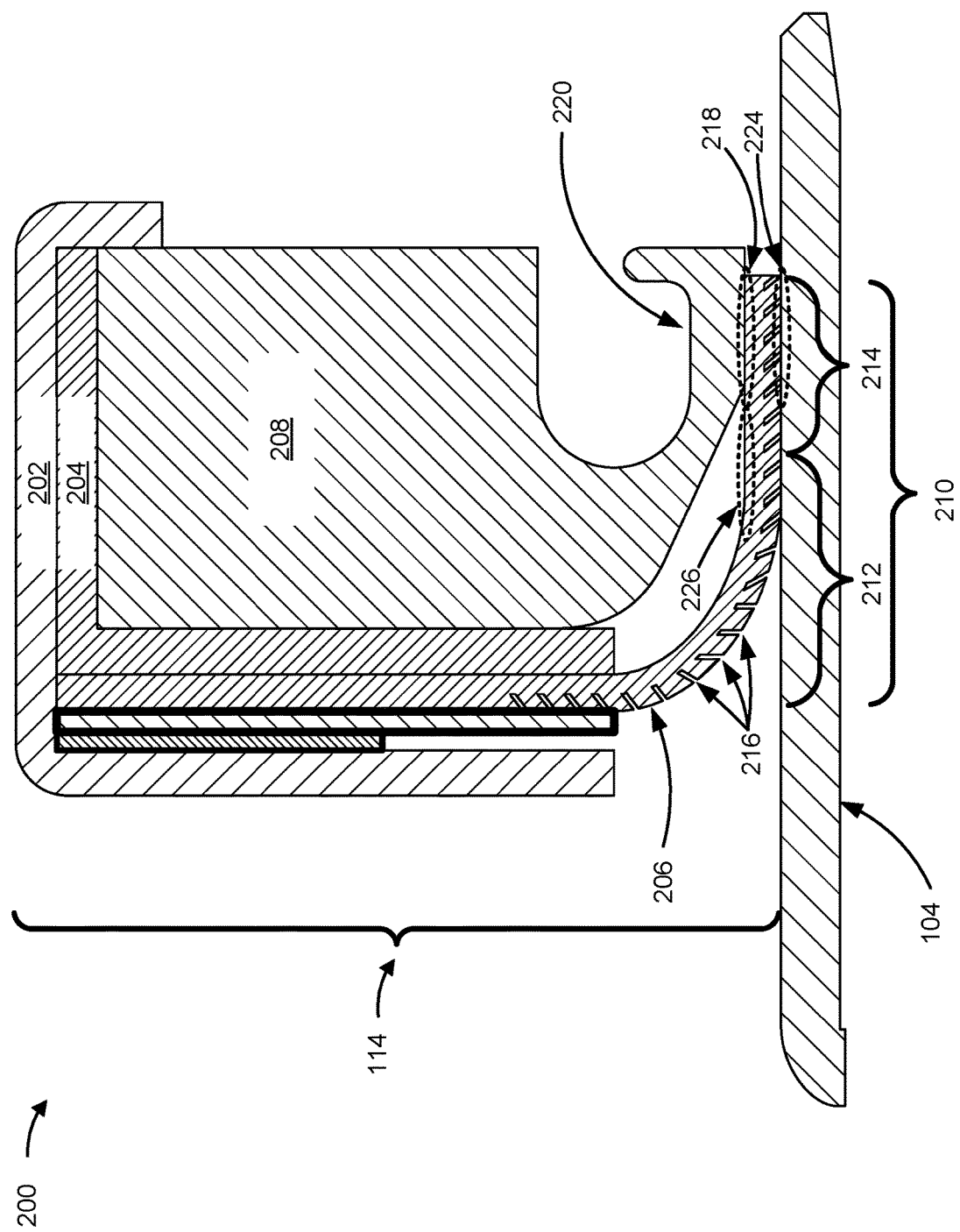
Figure 2D:
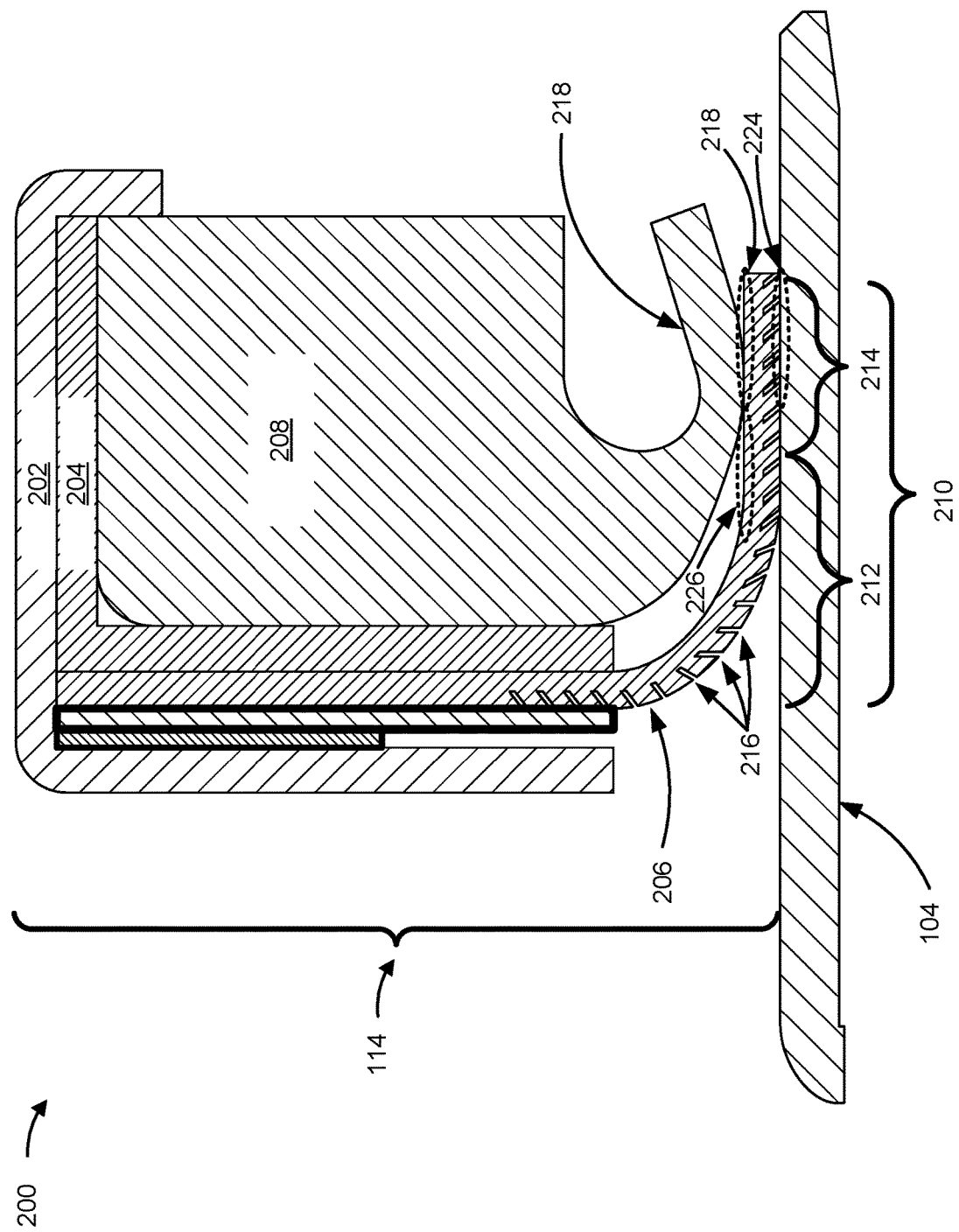
Figure 2E:
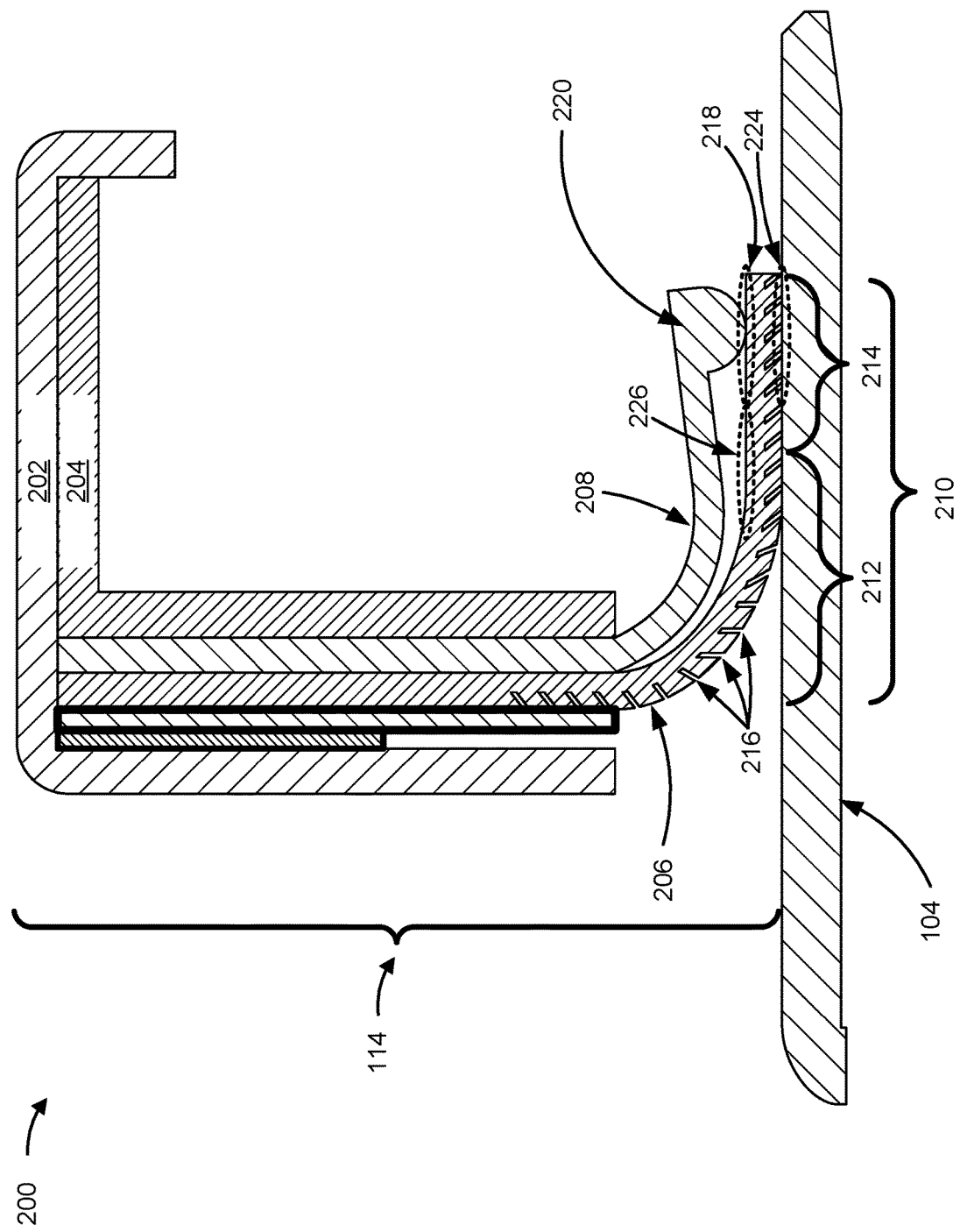
Figure 2F:
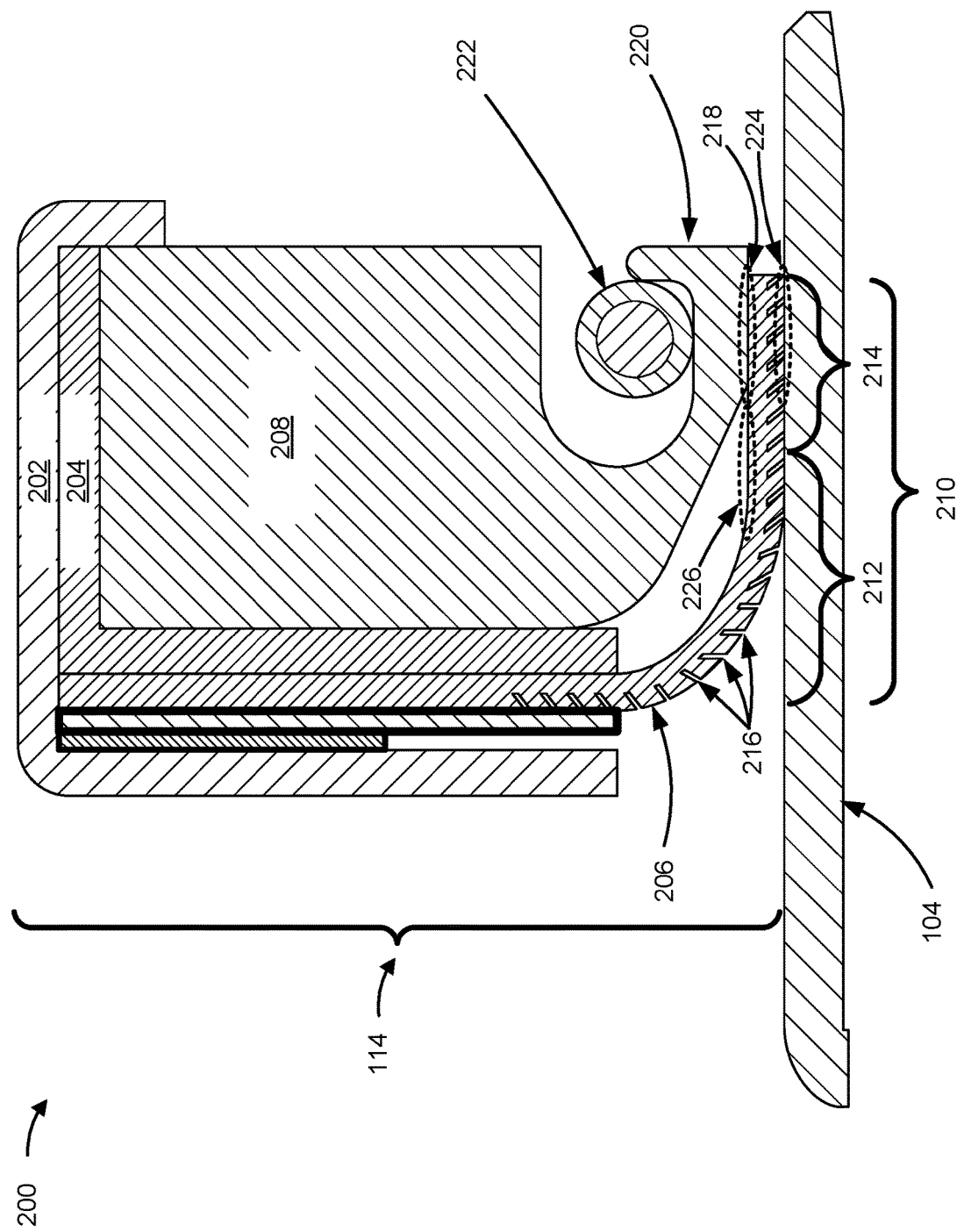
Figure 2G:
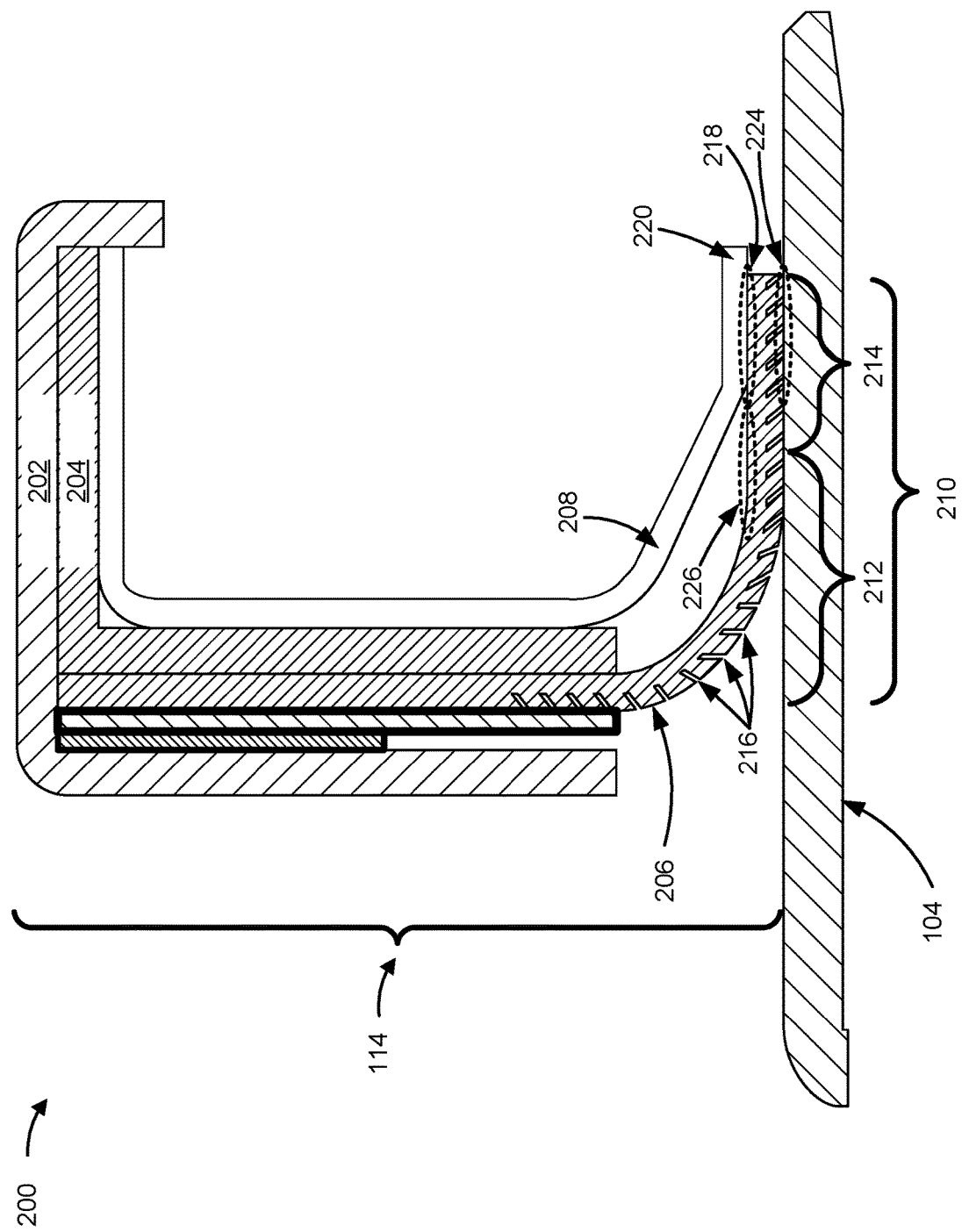

The followability enhancer 208 may comprise rubber (e.g., a molded rubber), a plastic, a metal, or a similar material. As shown in FIGS. 2A-2G, the followability enhancer may be a monolithic component. The followability enhancer 208 may be connected to at least one of the outer casing 202 or the inner casing 204. For example, as shown in FIGS. 2A-2D and 2F-2G, a portion of the followability enhancer 208 (e.g., a top section and a side section) may contact an interior side of the inner casing 204. The portion of the followability enhancer 208 may be connected to the interior side of the inner casing 204 by one or more mechanical fasteners, an adhesive material, and/or a press fit connection, among other examples. As shown in FIGS. 2A, 2D, and 2G the portion of the followability enhancer 208 may discontinuously contact the interior side of the inner casing 204 (e.g., by not contacting a corner of the interior side of the inner casing 204), while, as shown in FIGS. 2B, 2C, and 2F, the portion of the followability enhancer 208 may continuously contact the interior side of the inner casing 204 (e.g., by fully contacting the corner of the interior side of the inner casing 204). As another example, as shown in FIG. 2E, a portion of the followability enhancer 208 may be disposed between the inner casing 204 and the outer casing 202, such as by being positioned in the space formed between the inner casing 204 and the outer casing 202. Accordingly, the inner casing 204 and the outer casing 202 may clamp the portion of the followability enhancer 208 (and the portion of the rotational seal 206) such that that the followability enhancer 208 remains connected to the inner casing 204 and/or the outer casing 202 (e.g., during operation of the rotating component 104).

In some implementations, the followability enhancer 208 may be configured to contact a first region 218 of a top surface of the section 210 of the rotational seal 206 that is associated with the toe portion 214 (e.g., during operation of the rotating component 104). For example, as shown in FIGS. 2A-2G, the followability enhancer 208 may include an elastically compliant feature 220, which may be configured to contact the first region 218 of a top surface of the section 210 of the rotational seal 206 that is associated with the toe portion 214 (e.g., during operation of the rotating component 104). In some implementations, the followability enhancer 208 and/or the elastically compliant feature 220 may be configured to not contact, when the rotating component 104 is not operating, the first region 218 of the top surface of the section 210 of the rotational seal 206 that is associated with the toe portion 214.

As shown in FIGS. 2A-2G, the elastically compliant feature 220 may be a lip (e.g., of any particular shape or size), or a similar structure, and may be configured to exert at least one amount of force on the first region 218 of the top surface of the section 210 of the rotational seal 206 that is associated with the toe portion 214. For example, the elastically compliant feature 220 may be configured to be flexible and therefore bounce during operation of the rotating component 104, which causes the elastically compliant feature 220 to exert multiple different amounts of force on the first region 218 of the top surface of the section 210 of the rotational seal 206 that is associated with the toe portion 214. Accordingly, the at least one amount of force exerted by the elastically compliant feature 220 may be within a particular force amount range (e.g., greater than or equal to a minimum force and less than or equal to a maximum force associated with an optimal performance of the rotational seal 206).

As shown in FIG. 2F, the followability enhancer 208 may include a spring component 222 (e.g., a coil spring, an extension spring, a retainer spring, or a spring clip, among other examples). The spring component 222 may be configured to contact the elastically compliant feature 220 and to resist (e.g., during operation of the rotating component 104) movement of the elastically compliant feature 220 away from the first region 218 of the top surface of the section 210 of the rotational seal 206 that is associated with the toe portion 214. For example, the spring component 222 may be configured to cause the elastically compliant feature 220 to continually exert at least one amount of force on the first region 218 of the top surface of the section 210 of the rotational seal 206 that is associated with the toe portion 214 (e.g., during operation of the rotating component 104).

The followability enhancer 208 contacting the first region 218 of the top surface of the section 210 of the rotational seal 206 that is associated with the toe portion 214 may cause a corresponding region 224 of the bottom surface of the section 210 of the rotational seal 206 that is associated with the toe portion 214 to contact the rotating component 104 (e.g., during operation of the rotating component 104). For example, when the elastically compliant feature 220 contacts the first region 218 of the top surface of the section 210 of the rotational seal 206 that is associated with the toe portion 214, the corresponding region 224 of the bottom surface of the section 210 of the rotational seal 206 that is associated with the toe portion 214 contacts the rotating component 104 (e.g., during operation of the rotating component 104).

Additionally, or alternatively, the followability enhancer 208 may be configured to not contact, such as during operation of the rotating component 104, a second region 226 of the top surface of the section 210 of the rotational seal 206 that is associated with the heel portion 212. For example, the elastically compliant feature 220 may be configured to not contact (e.g., during operation of the rotating component 104) the second region 226 of the top surface of the section 210 of the rotational seal 206 that is associated with the heel portion 212. Further, the followability enhancer 208 and/or the elastically compliant feature 220 may be configured to contact, of the rotational seal 206, only the first region 218 of the top surface of the section 210 of the rotational seal 206 that is associated with the toe portion 214 (e.g., may be configured to not contact any other region of the top surface of the section 210 of the rotational seal 206).

As indicated above, FIGS. 2A-2G are provided as one or more examples. Other examples may differ from what is described with regard to FIGS. 2A-2G.

INDUSTRIAL APPLICABILITY

The disclosed followability enhancer may be used in any rotational seal assembly that is associated with a rotating component of a machine. In a typical rotational seal assembly (e.g., without a followability enhancer), a radial load distribution on a rotational seal of the rotational seal assembly is highest on a heel portion of a section of the rotational seal that contacts the rotating component. This results in a higher wear rate on the heel portion than that on a toe portion of the section of the rotational seal. Consequently, due to uneven wear, the toe portion of the section of the rotational seal is more likely to disengage from contacting the rotating component (e.g., due to mechanical forces associated with operation of the rotating component, such as from dynamic runout, shaft-to-bore misalignment, and/or end-play), which results in premature failure of the rotational seal (e.g., the rotation seal no longer prevents transmission of a liquid fluid associated with operation of the rotating component).

The followability enhancer disclosed herein is configured to contact and to exert at least one amount of force on a first region of a top surface of the section of the rotational seal that is associated with the toe portion. Accordingly, this causes the radial load distribution on the rotational seal to shift, such that some of the of the radial load that would otherwise be exerted on the heel portion of the section of the rotational seal is redistributed and exerted on the toe portion of the section of the rotational seal. This reduces a wear rate on the heel portion and/or increases a wear rate on the toe portion, which causes the heel portion and the toe portion to wear more evenly. In this way, due to more even wear, the toe portion of the section of the rotational seal is more likely to continually contact the rotating component, which reduces a likelihood of premature failure of the rotational seal. Further, because the followability enhancer actively causes the rotational seal to continually contact the rotating component, a sealing performance of the rotational seal is improved (e.g., because the followability enhancer increases a likelihood that more surface area of the section of the rotational seal contacts the rotating component during operation of the rotating component).

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "bottom," "above," "upper," "top," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A rotational seal assembly associated with a rotating component, comprising:
    an outer casing;
    an inner casing;
    a rotational seal connected to the outer casing and the inner casing; and
    a followability enhancer including an elastically compliant feature that is a lip adjacent to a recess of the followability enhancer,
    wherein:
        the rotational seal includes:
            a heel portion corresponding at least partially to a bend of the rotational seal, and
            a toe portion extending from the heel portion to a distal end of the rotational seal,
        the toe portion is in contact with the rotating component,
        a part of the heel portion is in contact, during operation of the rotating component, a first part of the lip is in contact with a first part of the toe portion before the operation of the rotating component, a second part of the lip is in contact with a second part of the toe portion before the operation of the rotating component, a part of the followability enhancer, that is between the second part of the lip and an outward bend of the followability enhancer, is not in contact with the heel during the operation of the rotating component, the outward bend of the followability enhancer is between the recess of the followability enhancer and the bend of the rotational seal, the first part of the lip extends beyond an end of the toe portion, the first part of the lip does not contact the first part of the toe portion during the operation of the rotating component, and the second part of the lip remains in contact with the second part of the toe portion during the operation of the rotating component.

2. The rotational seal assembly of claim 1,
wherein the followability enhancer further includes a spring component, and
wherein the spring component is configured to contact the elastically compliant feature and to resist, during the operation of the rotating component, movement of the elastically compliant feature away from the toe portion.

3. The rotational seal assembly of claim 1, wherein the followability enhancer comprises at least one of:
rubber,
a plastic, or
a metal.

4. The rotational seal assembly of claim 1, wherein an outside top side of the followability enhancer is connected to an inner side of the inner casing.

5. The rotational seal assembly of claim 1, wherein a different part of the followability enhancer is disposed between the outer casing and the inner casing.

6. The rotational seal assembly of claim 1, wherein the followability enhancer is a monolithic component.

7. The rotational seal assembly of claim 1, wherein the first part of the lip contacting the first part of the toe portion is configured to cause the first part of the toe portion to contact, during the operation of the rotating component, the rotating component.

8. The rotational seal assembly of claim 1, wherein the toe portion being in contact with the rotating component is based on the toe portion being configured to contact the rotating component during the operation of the rotating component.

9. The rotational seal assembly of claim 1, wherein the first part of the toe portion includes the end of the toe portion.

10. A rotational seal assembly associated with a rotating component, comprising:
an outer casing;
an inner casing;
a rotational seal connected to the outer casing and the inner casing,
the rotational seal including:
a toe portion extending from a distal end of the rotational seal, and
a heel portion extending from the toe portion and through a bend of the rotational seal; and
a followability enhancer including:
an opening on a first side of the followability enhancer,
a lip adjacent to the opening, and
a part, of the followability enhancer, that is between the lip and a second side of the followability enhancer,
the part of the followability enhancer including an outward bend of the followability enhancer,
a part of the heel portion being in contact with the rotating component during operation of the rotating component,
a first part of the lip being in contact with a first part of the toe portion before the operation of the rotating component,
a second part of the lip being in contact with a second part of the toe portion before the operation of the rotating component,
the outward bend of the followability enhancer being between the opening of the followability enhancer and the bend of the rotational seal,
the first part of the lip extending beyond an end of the toe portion,
the first part of the lip being not in contact with the first part of the toe portion during the operation of the rotating component, and
the second part of the lip remaining in contact with the second part of the toe portion during the operation of the rotating component.

11. The rotational seal assembly of claim 10,
wherein the followability enhancer comprises an elastically compliant feature, and
wherein the elastically compliant feature is the lip.

12. The rotational seal assembly of claim 11, wherein the elastically compliant feature, when contacting the toe portion, is configured to exert at least one amount of force on the toe portion.

13. The rotational seal assembly of claim 10, wherein the lip contacting the toe portion is configured to cause the toe portion to contact, during the operation of the rotating component, the rotating component.

14. The rotational seal assembly of claim 10, wherein the followability enhancer is a monolithic component.

* * * * *